(12) United States Patent
Hirata et al.

(10) Patent No.: US 8,780,474 B2
(45) Date of Patent: Jul. 15, 2014

(54) WRITING DATA TO TAPE MEDIUM

(75) Inventors: Takamasa Hirata, Tokyo (JP); Setsuko Masuda, Yokohama (JP); Yuhko Mori, Yokohama (JP); Yutaka Oishi, Kawasaki (JP); Tomoko Taketomi, Yamato (JP); Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/167,943

(22) Filed: Jun. 24, 2011

(65) Prior Publication Data

US 2012/0002317 A1 Jan. 5, 2012

(30) Foreign Application Priority Data

Jun. 30, 2010 (JP) .............................. 2010-0149607

(51) Int. Cl.
*G11B 5/09* (2006.01)

(52) U.S. Cl.
USPC .............. 360/48; 360/53; 360/75; 360/77.12; 360/78.02

(58) Field of Classification Search
None
See application file for complete search history.

(56) References Cited

U.S. PATENT DOCUMENTS

| | | | | |
|---|---|---|---|---|
| 5,442,638 | A | * | 8/1995 | Awad et al. ................... 714/6.12 |
| 5,485,321 | A | * | 1/1996 | Leonhardt et al. .............. 360/48 |
| 5,539,586 | A | * | 7/1996 | Inoue et al. .................... 386/248 |
| 6,201,654 | B1 | * | 3/2001 | Okamoto et al. ............... 360/48 |
| 6,856,479 | B2 | | 2/2005 | Jaquette et al. |
| 6,865,043 | B2 | | 3/2005 | Ataku et al. |
| 6,898,036 | B2 | * | 5/2005 | Gill et al. ........................ 360/53 |
| 7,389,467 | B2 | * | 6/2008 | Kim et al. ...................... 714/763 |
| 2004/0230741 | A1 | * | 11/2004 | Watanabe ...................... 711/111 |
| 2007/0079059 | A1 | * | 4/2007 | Itagaki et al. .................. 711/111 |
| 2008/0007856 | A1 | * | 1/2008 | Tango et al. .................... 360/53 |

FOREIGN PATENT DOCUMENTS

| | | |
|---|---|---|
| JP | 10188489 A | 7/1998 |
| JP | 2001291330 A | 10/2001 |
| JP | 2006070668 A | 3/2006 |
| JP | 2007073108 A | 3/2007 |
| JP | 2007095231 A | 4/2007 |
| WO | 2006070668 A1 | 7/2009 |

* cited by examiner

*Primary Examiner* — Dismery Mercedes
(74) *Attorney, Agent, or Firm* — Griffiths & Seaton PLLC (57) ABSTRACT

In a controller of a tape drive, a CM input-output unit recognizes a tape format; a tape variable acquisition unit acquires tape variables; a setting variable acquisition unit acquires setting variables; and a minimum number calculator calculates a minimum number m of sub datasets, which are to be written to a tape to secure resistance to burst error, by using the tape variables and setting variables. When a command processor receives a synchronization command, the buffer manager generates n sub datasets for storing data in the buffer. If n is smaller than m, m sub datasets are padded out and set as write data. If n is m or more, the n sub datasets are set as write data. Then, the channel input-output unit writes the write data to the tape.

10 Claims, 7 Drawing Sheets

| TRANSACTION SIZE | 4096 byte | 505442 byte | 1010832 byte |
|---|---|---|---|
| CONVENTIONAL EXAMPLE | 100 (= 50 + 50) | 100 (= 50 + 50) | 100 (= 50 + 50) |
| COMPARATIVE EXAMPLE | 65.6 (= 50 + 50 / 64[sds] * 20[sds]) | 81.3 (= 50 + 50 / 64[sds] * 40[sds]) | 96.9 (= 50 + 50 / 64[sds] * 60[sds]) |
| INVENTIVE EXAMPLE | 65.6 (= 50 + 50 / 64[sds] * 20[sds]) | 66.4 (= 50 + 50 / 64[sds] * 21[sds]) | 82.0 (= 50 + 50 / 64[sds] * 41[sds]) |

WRITING DATA TO TAPE MEDIUM

PRIORITY CLAIM

This application claims priority to Japanese Patent Application No. 2010-0149607, filed Jun. 30, 2010, which is hereby incorporated by reference in its entirety.

BACKGROUND OF THE INVENTION

1. Field of the Invention

The present invention relates generally to computers, and more particularly to mechanisms for writing data to a tape medium in a computing environment.

2. Description of the Related Art

The present invention relates to an apparatus and method for writing data to a tape medium. Particularly, the present invention relates to an apparatus and method for writing reception data received from a higher-level apparatus to a tape medium in response to a synchronization instruction for writing the reception data to the tape medium.

A tape drive for writing data to a tape medium such as a magnetic tape is generally configured to temporarily accumulate the data in a buffer and to write the data to the tape medium from the buffer at a predetermined timing. Such writing from the buffer to the tape medium is called "synchronization of writing" or "buffer flush" (hereafter, simply referred to as "synchronization").

When the synchronizations are performed without stopping the tape medium, a large gap is formed on the tape medium between data written in a preceding synchronization and data written in a subsequent synchronization. As a result, a recording region of the tape media is wasted. Accordingly, there is a need to perform backhitch to write the data in the subsequent synchronization without a very large gap formed after the data written in the preceding synchronization. Backhitch is an operation of temporarily stopping the tape medium by reducing the running speed, and rewinding the tape medium up to a position where writing is to be performed. Thus, the synchronization consumes much time due to this backhitch.

In this respect, Recursive Accumulating Backhitchless Flush (RABF) is proposed as a technique for avoiding such situations in U.S. Pat. No. 6,856,479, and U.S. Pat. No. 6,865,043, for example. As described in these documents, RABF may be understood as the following. To be specific, upon receiving a synchronization request, a tape drive firstly writes data, accumulated in a buffer and not yet written to a tape medium, to a temporally recording region (ABF wrap) reserved on the tape medium while running the tape medium. Note that this writing is a buffer flush without backhitch (Backhitchless Flush) which is free from a problem of a gap between data written in a previous synchronization and data written in a subsequent synchronization. Meanwhile, the tape drive recursively performs operations of accumulating data in the buffer and rewriting the data to a normal recording region (normal wrap) when no free space is left in the buffer or the temporary recording region.

As described above, when the synchronization is performed, no backhitch is required for the subsequent synchronization in RABF. Thus, time required for the synchronization can be reduced. Drastic improvement in performance can be achieved particularly when the frequency of synchronization requests is high as compared with a data amount.

Meanwhile, in a tape drive for enterprise (such as IBM® model 3592) and a tape drive in compliance with LTO standards, variable-length data sent from a host is reorganized to be written to a tape medium in units of datasets having a fixed length. Generally, in this case, the data is simultaneously written to multiple tracks (for example, 16 tracks). In other words, $1/16$, for example, of a content of the dataset is written to each track. Furthermore, the dataset includes an error correction code and the like in addition to the data sent from the host. A product code of a C1 code and a C2 code is used as the error correction code. The C1 code is for correcting random error in units of bytes in writing and reading, whereas the C2 code is for correcting burst error which is caused by write elements of the tape drive or by a defect on the tape. Moreover, the data is interleaved in the dataset. In other words, the data is arranged in a non-contiguous way. Thus, even when approximately 20% of the data is lost in any area in the dataset, the entire data can be recovered from the remaining data.

However, recent improvement in a recording density has reduced a recording length per unit data, which makes a situation more frequently occur where a part of the data of the dataset cannot be read due to a defect or dust on the tape medium. As a countermeasure to prevent a situation where unreadable data fails to be recovered even by use of the error correction code, the capacity of the dataset tends to increase from one generation to the next.

Meanwhile, there is a known technique for transferring only part of sub-units having data corrected for error when returning the corrected data from error correction means to an external buffer. However, as the capacity of the dataset becomes larger as described above, the time of writing the dataset becomes a bottleneck in RABF if a transaction size, that is, a data amount written from the host in a period between two consecutive synchronizations is smaller than the size of the dataset. Specifically, it is known that more than half of the time required to write the dataset in RABF is purely proportional to the number of bits included in the dataset. For example, if the transaction size is 4 KB, a whole dataset having the rest of the bytes padded is written to the tape medium. In other words, in a generation of a 403 KB dataset size, writing data of 403 KB is sufficient. However, in a generation of a 1.6 MB dataset size, data of 1.6 MB is to be written to the tape medium. Accordingly, there is a problem that the generation of the 1.6 MB dataset size cannot achieve performance equal to that in the generation of the 403 KB dataset size. Such problem may occur not only in RABF but also in normal writing. There is currently no effective means to address this problem.

SUMMARY OF THE DESCRIBED EMBODIMENTS

An object of the present invention is to improve the performance of writing to a tape medium while securing resistance to error.

To achieve the object, the present invention provides an apparatus that sets information to be referred to when data is written to a tape medium. The apparatus includes: a size acquisition unit that acquires the size of an area on the tape medium that may be affected by a trouble if the trouble occurs on the tape medium; a ratio acquisition unit that acquires a ratio of a part of data written to the tape medium with respect to the entire data, provided that the part is defined as a trivial part allowing the entire data to be recovered even with a failure in reading the part; and a determination unit that, by using the size acquired by the size acquisition unit and the ratio acquired by the ratio acquisition unit, determines a minimum number of data blocks to form write data such that the entire write data can be recovered even if a part of the write data fails to be read due to the trouble, the write data being to be written to the tape medium in response to a synchronization instruction to write reception data received from a higher-level apparatus to the tape medium.

Here, the apparatus may include: a reception unit that receives the synchronization instruction; a generation unit that generates the write data when the reception unit receives the synchronization command, in such a manner that if the reception data is smaller than the data blocks of the number determined by the determination unit, the write data contains the reception data and includes the data blocks of the number determined by the determination unit, and that if the reception data is equal to or larger than the data blocks of the number determined by the determination unit, the write data includes a minimum necessary number of data blocks required to contain the reception data; and a writing unit that writes the write data generated by the generation unit to the tape medium.

In addition, the apparatus may include a running controller that controls running of the tape medium such that hitchback is not performed after the write data is written to the tape medium by the writing unit.

Further, the apparatus may include an identification unit that identifies a type of a format of the tape medium. In the apparatus, the ratio acquisition unit acquires the ratio corresponding to the type of the format identified by the identification unit.

Still further, the present invention provides an apparatus that writes reception data received from a higher-level apparatus to a tape medium in response to a synchronization instruction to write the reception data to the tape medium. The apparatus includes: a number acquisition unit that acquires a minimum number of data blocks to form write data to be written to the tape medium in response to the synchronization instruction, the minimum number of data blocks allowing recovery of the entire write data even if a part of the write data fails to be read due to trouble occurring on the tape medium; a reception unit that receives the synchronization instruction; a generation unit that generates the write data when the reception unit receives the synchronization command, in such a manner that if the reception data is smaller than the data blocks of the number acquired by the number acquisition unit, the write data includes the data blocks of the number acquired by the number acquisition unit and contains the reception data, and that if the reception data is equal to or larger than the data blocks of the number acquired by the number acquisition unit, the write data includes a minimum necessary number of data blocks required to contain the write data; and a writing unit that writes the write data generated by the generation unit to the tape medium.

Here, the apparatus may include: a size acquisition unit that acquires a size of an area on the tape medium to be affected by the trouble; a ratio acquisition unit that acquires a ratio of a part of data written to the tape medium with respect to the entire data, provided that the part is defined as a trivial part allowing the entire data to be recovered even with a failure in reading the part; and a determination unit that determines the number of the data blocks to be acquired by the number acquisition unit, by using the size acquired by the size acquisition unit and the ratio acquired by the ratio acquisition unit.

Moreover, the present invention provides an apparatus that writes reception data received from a higher-level apparatus to a tape medium in response to a synchronization instruction to write the reception data to the tape medium. The apparatus includes: a size acquisition unit that acquires the size of an area on the tape medium that may be affected by trouble if the trouble occurs on the tape medium; a ratio acquisition unit that acquires a ratio of a part of data written to the tape medium with respect to the entire data, provided that the part is defined as a trivial part allowing the entire data to be recovered even with a failure in reading the part; and a determination unit that, by using the size acquired by the size acquisition unit and the ratio acquired by the ratio acquisition unit, determines a minimum number of data blocks to form write data such that the entire write data can be recovered even if a part of the write data fails to be read due to the trouble, the write data being to be written to the tape medium in response to a synchronization instruction to write reception data received from a higher-level apparatus to the tape medium; a reception unit that receives the synchronization instruction; a generation unit that generates the write data when the reception unit receives the synchronization instruction, in such a manner that if the reception data is smaller than the data blocks of the number determined by the determination unit, the write data includes the number of data blocks by adding padding data to the reception data, and that if the reception data is equal to or larger than the data blocks of the number determined by the determination unit, the write data includes: a minimum necessary number of data blocks required to contain the reception data; and a writing unit that writes the write data generated by the generation unit to the tape medium.

In addition, the present invention provides a method for writing reception data received from a higher-level apparatus to a tape medium in response to a synchronization instruction to write the reception data to the tape medium. The method includes the steps of: acquiring a minimum number of data blocks to form write data to be written to the tape medium in response to the synchronization instruction, the minimum number being for recovering entire data even if a part of the write data fails to be read due to a trouble occurring on the tape medium; receiving the synchronization instruction; upon receipt of the synchronization instruction, generating the write data in such a manner that if the reception data is smaller than the acquired number of data blocks, the write data includes the acquired number of data blocks containing the reception data, and that if the reception data is equal to or larger than the acquired number of data blocks, the write data includes a minimum necessary number of data blocks required to contain the write data; and writing the write data generated by the generation unit to the tape medium.

Yet further, the present invention provides a computer program product for causing a computer to function as an apparatus that sets information to be referred to when data is written to a tape medium. The program product causes the computer to function as: a size acquisition unit that acquires a size of an area on the tape medium to be affected by the trouble; a ratio acquisition unit that acquires a ratio of a part of data written to the tape medium with respect to the entire data, provided that the part is defined as a trivial part allowing the entire data to be recovered even with a failure in reading the part; and a determination unit that, by using the size acquired by the size acquisition unit and the ratio acquired by the ratio acquisition unit, determines a minimum number of data blocks to form write data such that the entire write data can be recovered even if a part of the write data fails to be read due to the trouble, the write data being to be written to the tape medium in response to a synchronization instruction to write reception data received from a higher-level apparatus to the tape medium.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

An embodiment of the present invention will be described below in detail with reference to the attached drawings.

Figure 1:
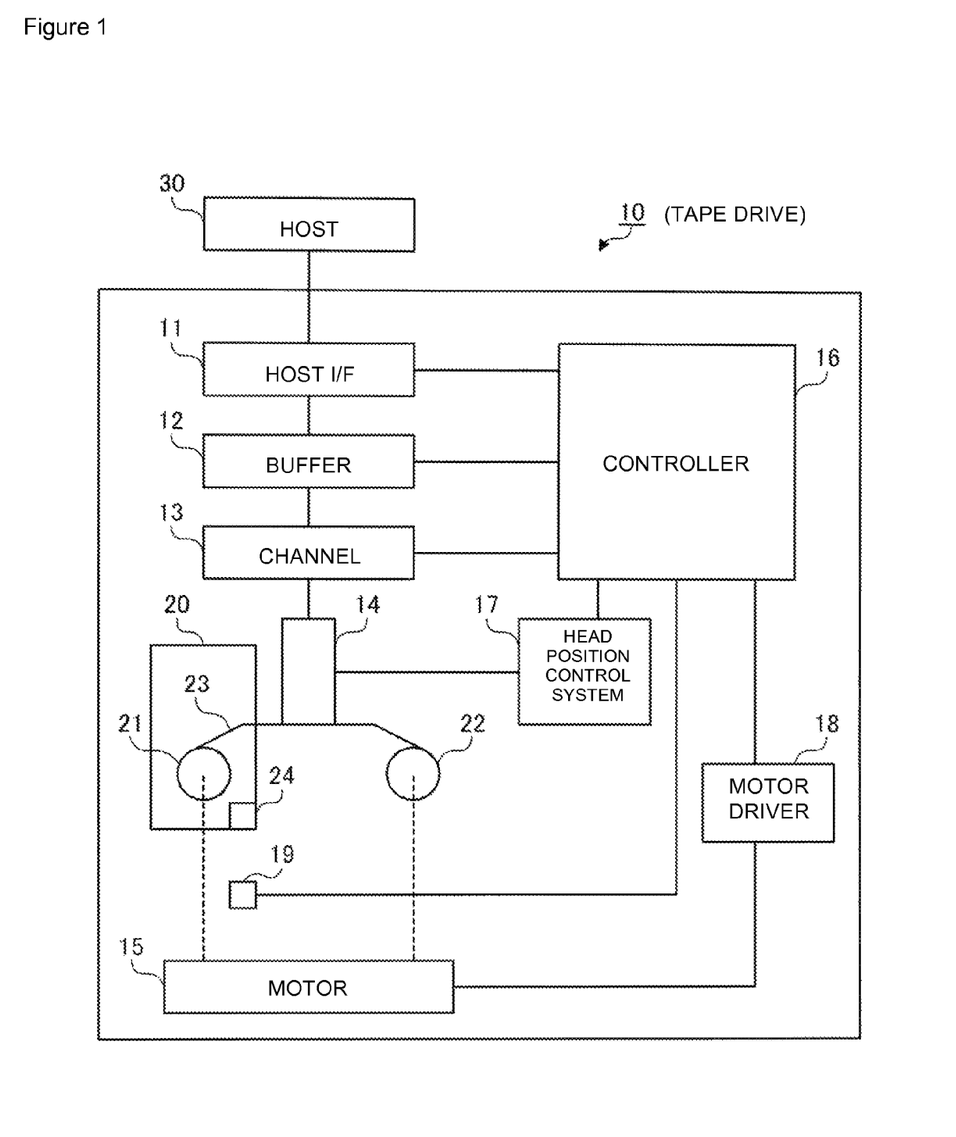
FIG. 1 is a block diagram showing a configuration of a tape drive to which an embodiment of the present invention is applied.

FIG. 1 is a diagram showing a configuration example of a tape drive 10 to which this embodiment is applied. The tape drive 10 includes a host interface (hereafter, referred to as "host I/F") 11, a buffer 12, a channel 13, a head 14, and a motor 15. In addition, the tape drive 10 includes a controller 16, a head position control system 17, and a motor driver 18. Furthermore, since the tape drive 10 is configured such that a tape cartridge 20 can be inserted therein, the tape cartridge 20 is also shown in FIG. 1. The tape cartridge 20 includes a tape 23 wound around reels 21, 22. The tape 23 moves in a longitudinal direction thereof from the reel 21 to the reel 22, or from the reel 22 to the reel 21 along with the rotation of the reels 21, 22. Note that, although a magnetic tape is given as an example of the tape 23, a tape medium other than the magnetic tape can be used.

The tape cartridge 20 also includes a cartridge memory 24. For example, the cartridge memory 24 stores information that indicates how data is written in the tape 23. For example, an RF interface is used to examine an index of the data written to the tape 23, usage state of the tape 23, and the like in a non-contact manner, and this allows the data to be accessed at high speed. Note that, an interface for accessing the cartridge memory 24, such as the RF interface, is shown in FIG. 1 as a cartridge memory interface (hereafter, referred to as CM I/F) 19.

The host I/F 11 performs communication with a host 30 which is an example of a higher-level apparatus. For example, the host I/F 11 receives from the host 30 a command instructing the tape drive 10 to write data to the tape 23, a command to move the tape 23 to a target position, and a command instructing the tape drive 10 to read data from the tape 23. Note that, SCSI is given as an example of a communication standard used in the host I/F 11. In SCSI, the first command corresponds to a Write command, the second command corresponds to a Locate command or a Space command, and the third command corresponds to a Read command. Moreover, the host I/F 11 sends the host 30 a reply that indicates whether processing corresponding to these commands has been successfully performed or has failed.

The buffer 12 is a memory for accumulating data to be written to the tape 23 and data read from the tape 23. The buffer 12 is configured of, for example, a dynamic random access memory (DRAM). Moreover, the buffer 12 includes multiple buffer segments. Each of the buffer segments stores a dataset which is a unit of writing the data to and read from the tape 23.

The channel 13 is a communication path used to send the head 14 the data to be written to the tape 23 and to receive the data read from the tape 23 from the head 14.

The head 14 writes information to the tape 23 or reads information from the tape 23 when the tape 23 moves in the longitudinal direction thereof.

The motor 15 rotates the reels 21, 22. Note that, although the motor 15 is depicted as a single rectangle in FIG. 1, it is preferable to provide a total of two motors 15, one for each of the reels 21, 22.

The controller 16 controls the entire tape drive 10. For example, the controller 16 controls writing of the data to the tape 23 and reading of the data from the tape 23 in accordance with a command received by the host I/F 11. Furthermore, the controller 16 controls the head position control system 17 and the motor driver 18.

The head position control system 17 is a system which tracks a desired wrap. Here, a wrap is a group of multiple tracks on the tape 23. When the wrap requires to be switched, the head 14 also requires to be switched electrically. Such switching is controlled by the head position control system 17.

The motor driver 18 drives the motor 15. Note that, when the number of the motors 15 provided is two as described above, the number of the motor drivers 18 provided is also two.

The CM I/F 19 is implemented by, for example, an RF reader/writer, and writes information to the cartridge memory 24 and reads information from the cartridge memory 24.

In this embodiment, the tape drive 10 having the configuration described above writes, as needed, not only data including updated information but also a group of data not including updated information (for example, sub datasets), thus securing resistance to burst error. Note that, although this embodiment is applicable to any case of writing data to the tape medium, a description will be given below by taking an example of a most preferable case where this embodiment is applied to writing of data to the tape medium in RABF.

Firstly, an algorithm in this embodiment will be described. In RABF, when data is written to the tape medium in units of dataset, an overhead becomes large if the transaction size is small. Meanwhile, when updated data is written to the tape medium in units of sub dataset, there are the following problems. If the sub dataset is set to be small, resistance to burst error cannot be secured. If the sub dataset is set to be large, the size of the overhead becomes unignorable as in the case where data is written in units of dataset.

Accordingly, in this embodiment, the sub dataset is set to be relatively small, and the minimum number of sub datasets to be written in one operation (in one synchronization) is set to be constant regardless of the transaction size.

Specifically, a minimum number m of sub datasets [sds] to be written in one operation is the smallest integer satisfying the following formula:

$$m > mdl * ld * not / csds / rr * fs \quad (1),$$

where mdl [m] is the maximum defect length (maximum value of the size of a defect, on the tape medium, which is expected to be recovered), ld [byte/m] is the linear density (linear recording density per track), not is the number of tracks (number of tracks used to write a certain dataset), csds [byte/sds] is the capacity of the sub dataset, rr is the recoverable ratio (maximum recoverable ratio which is a maximum ratio of a part recoverable by a C2 code to the entire data), and fs is the factor of safety.

Next, an effect in a case where this embodiment is applied to a format of a third-generation tape drive for enterprise (hereafter, referred to as "enterprise 3") will be described using specific values.

Firstly, although a defect on the tape medium can be of any size, it is natural to assume that the maximum value of the size of a defect expected to be recovered is approximately 3 [m], in consideration of limitations and the like in additional writing in the standards of the enterprise 3. Moreover, the factor of safety is set to 2.

According to the format of the enterprise 3, the linear recording density per track is 795 [byte/mm], and the number of tracks is 16. In the format of the enterprise 3, the size of the dataset is 1616940 [bytes]. One dataset is formed of 64 sub datasets, and the capacity of each sub dataset is 25272 [bytes]. Furthermore, according to the format of the enterprise 3, the entire data can be recovered by a C2 code even when 10 sub datasets out of the 64 sub datasets are lost. In this respect, the minimum number m of sub datasets to be written in RABF is calculated as 20 from the following formula:

$$m > 3*795*16/25272/(20/128)*2 = 19.3 \quad (2).$$

In other words, if 20 sub datasets are written, resistance to a defect of 3 mm can be secured. An effect of this embodiment and effects of different techniques will be compared using values.

Figure 2:
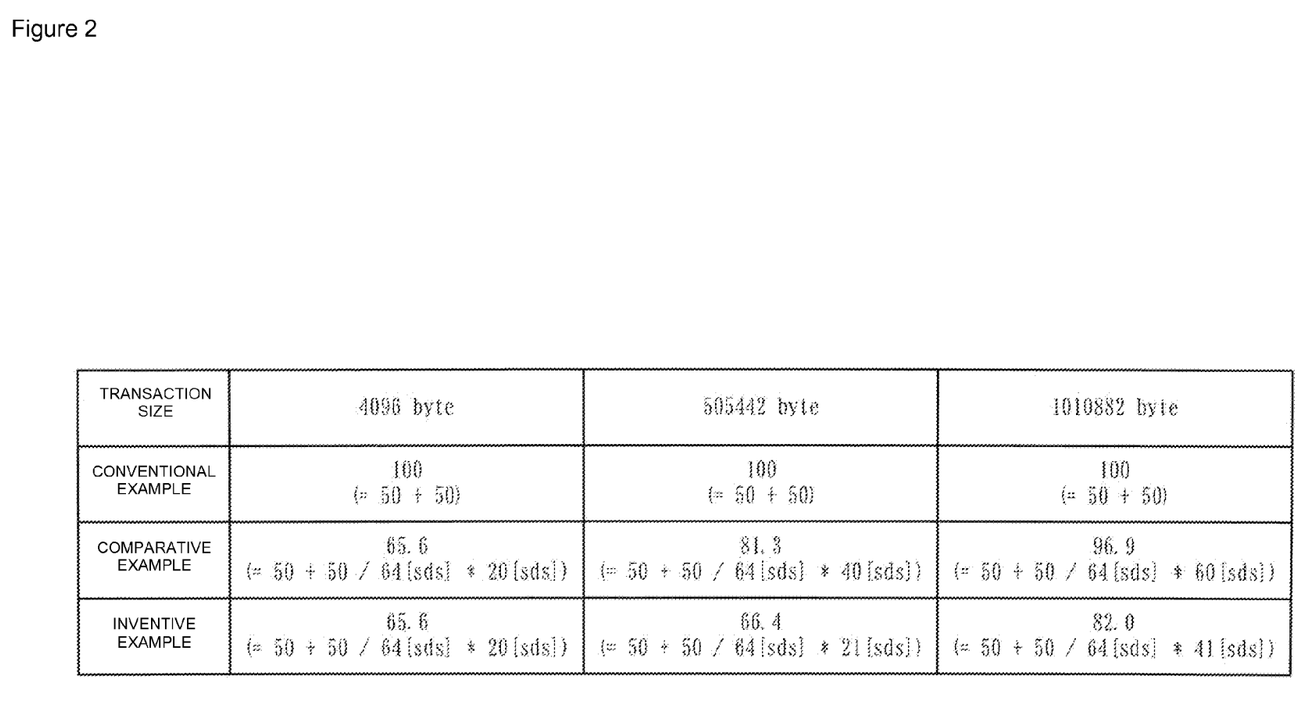
FIG. 2 is a table showing differences among the embodiment of the present invention and different techniques in values.

FIG. 2 is a table showing differences among the effect of this embodiment and the effects of the different techniques in values. Note that, conventional example in the drawing refers to the technique described in the section of "Background Art" in which writing is performed in units of dataset in RABF. Moreover, comparative example refers to a technique in which only updated sub dataset is written in RABF. Note that, in order to secure resistance to error, 20 sub datasets are defined as a new sub dataset, and data is written in units of new sub dataset. Inventive example corresponds to this embodiment.

Moreover, in FIG. 2, a time required for synchronization in the conventional example is set to "100" for each of transaction sizes, and time required for synchronization in the comparative example and that for the inventive example is shown in a value relative to the corresponding required time in the conventional example.

Currently, when one dataset is written in synchronization in RABF, it is known that a proportion of time required for processing of actually writing the dataset to the tape medium with respect to time required for synchronization processing is approximately 50%. The rest of the time is used for padding of a free space, adding of an error correction code, and the like. In this respect, the required time "100" in the conventional example is divided into "50" of a first section which is the time required for processing other than the processing of actually writing the dataset to the tape medium, and "50" of a second section which is the time required for the processing of actually writing the dataset to the tape medium. Consideration is made on how much "50" of the second section is reduced.

It is known from this table that, in this embodiment, when the transaction size is sufficiently small compared to the capacity of the dataset (when the transaction size is 4096 bytes), the synchronization processing can be completed in approximately 65% the time required for the conventional example in which data is written in units of dataset.

Moreover, in a comparison between this embodiment and the comparative example, there is not much difference when the transaction size is 4096 bytes. However, when the transaction size is 1010882 bytes, this embodiment can reduce the required time by approximately 15%.

In sum, this embodiment uses the sub dataset with small capacity as a unit for writing data to the tape medium, while the sub datasets without updated information are written together with the sub datasets with updated information as needed in this embodiment. This secures the minimum amount of data to be written in one operation regardless of the transaction size. It could be said that, this configuration is effective in improving the performance of the RABF.

Note that, in the comparative example of FIG. 2, it is natural to use 32 being the smallest divisor of 64 which is equal to or larger than 20 in an actual case and define 32 sub datasets as the new sub dataset. However, this embodiment is advantageous regardless of how the new sub dataset is defined.

The effect of this embodiment and the effects of the different techniques will be compared using a diagram schematically showing data written to tape media.

Figure 3:
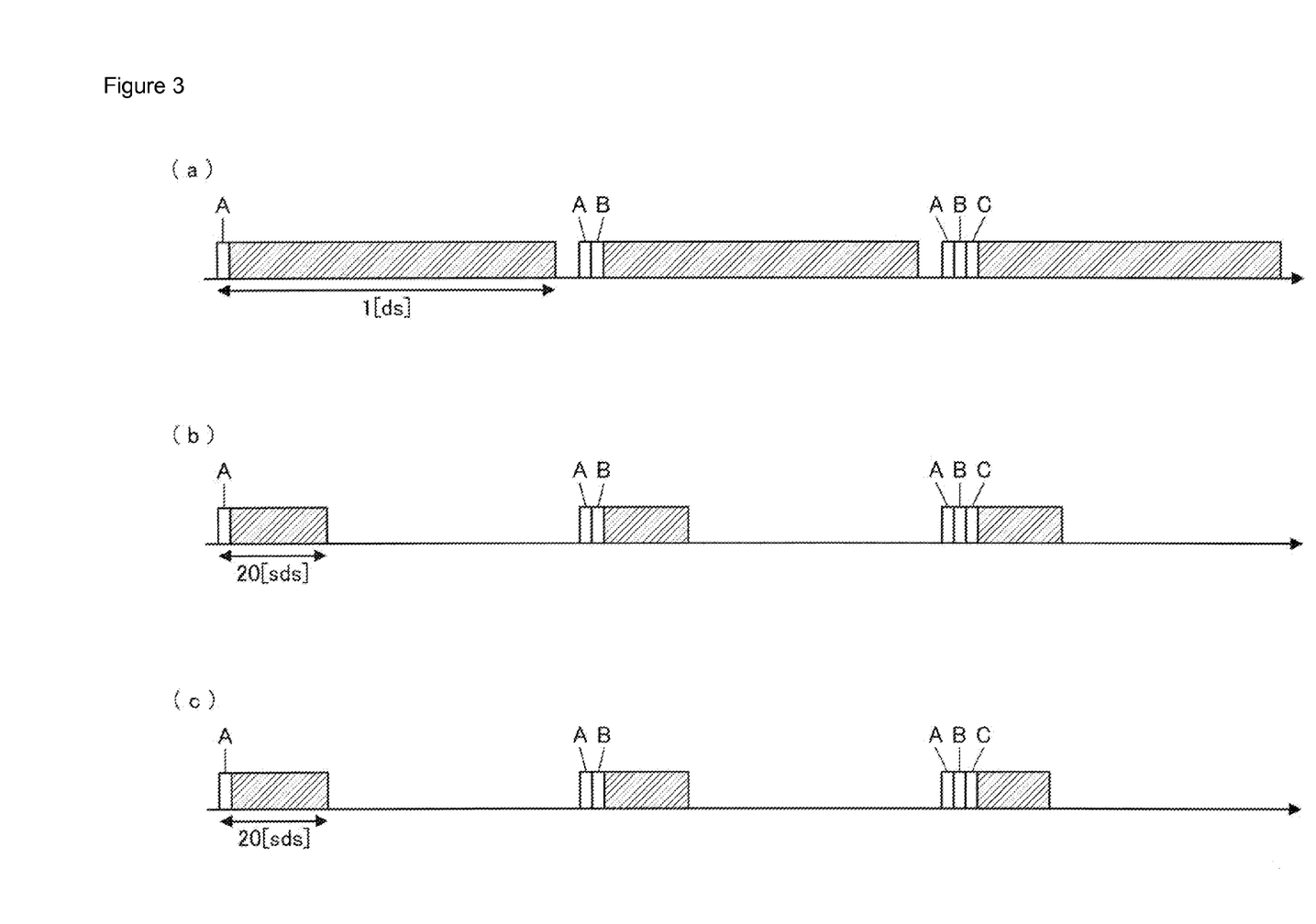
FIGS. 3A to 3C are diagrams schematically showing differences among the embodiment of the present invention and the different techniques.

FIGS. 3A to 3C show data written to tape media in synchronization in a case of the transaction size of 4096 bytes. Data written in the first synchronization, the second synchronization, and the third synchronization are shown from the left. In FIGS. 3A to 3C, "ds" denotes the dataset, and "sds" denotes the sub dataset.

FIG. 3A shows a case where data is written to the tape medium in synchronizations in the conventional example. In the conventional example, the dataset is formed by padding a part other than data sent from the host, as hatched by oblique lines. The data is written in units of this dataset. In FIG. 3A, sub datasets A, B, and C are accumulated in a certain dataset, and writing is performed in units of dataset. Accordingly, in the second synchronization, not only the sub dataset B including updated information but also the sub dataset A having already been written is written to the tape medium together. In the third synchronization, not only the sub dataset C including updated information but also the sub datasets A and B having already been written are written to the tape medium.

FIG. 3B shows a case where data is written to the tape medium in synchronizations in the comparative example. In the comparative example, a new sub dataset (corresponding to 20 sub datasets) is formed by padding a part other than data sent from the host, as hatched by oblique lines. The data is written in units of this new sub dataset. In FIG. 3B, first to twentieth sub datasets among the sub datasets forming the dataset are written in every synchronization. Accordingly, in the second synchronization, not only the sub dataset B including updated information but also the sub dataset A having already been written is written to the tape medium. In the third synchronization, not only the sub dataset C including updated information but also the sub datasets A and B having already been written are written to the tape medium. Note that, another comparative example is conceivable in which 20 sub datasets are not defined as the new sub dataset, and instead, only the updated datasets are written to the tape medium. However, this example has extremely low resistance to error, and thus is not illustrated in FIG. 3B.

FIG. 3C shows a case where data is written to the tape medium in synchronizations in the inventive example. In the inventive example, a group including the minimum number of sub datasets (corresponding to 20 sub datasets according to the calculation above) to be written is formed by padding a part other than data sent from the host, as hatched by oblique lines. The data is written in units of this group including the minimum number of sub datasets to be written. In FIG. 3C, first to twentieth sub datasets among the sub datasets forming the dataset are written in every synchronization. Accordingly, in the second synchronization, not only the sub dataset B including updated information but also the sub dataset A having already been written is written to the tape medium. In the third synchronization, not only the sub dataset C including updated information but also the sub datasets A and B having already been written are written to the tape medium.

Figure 4:
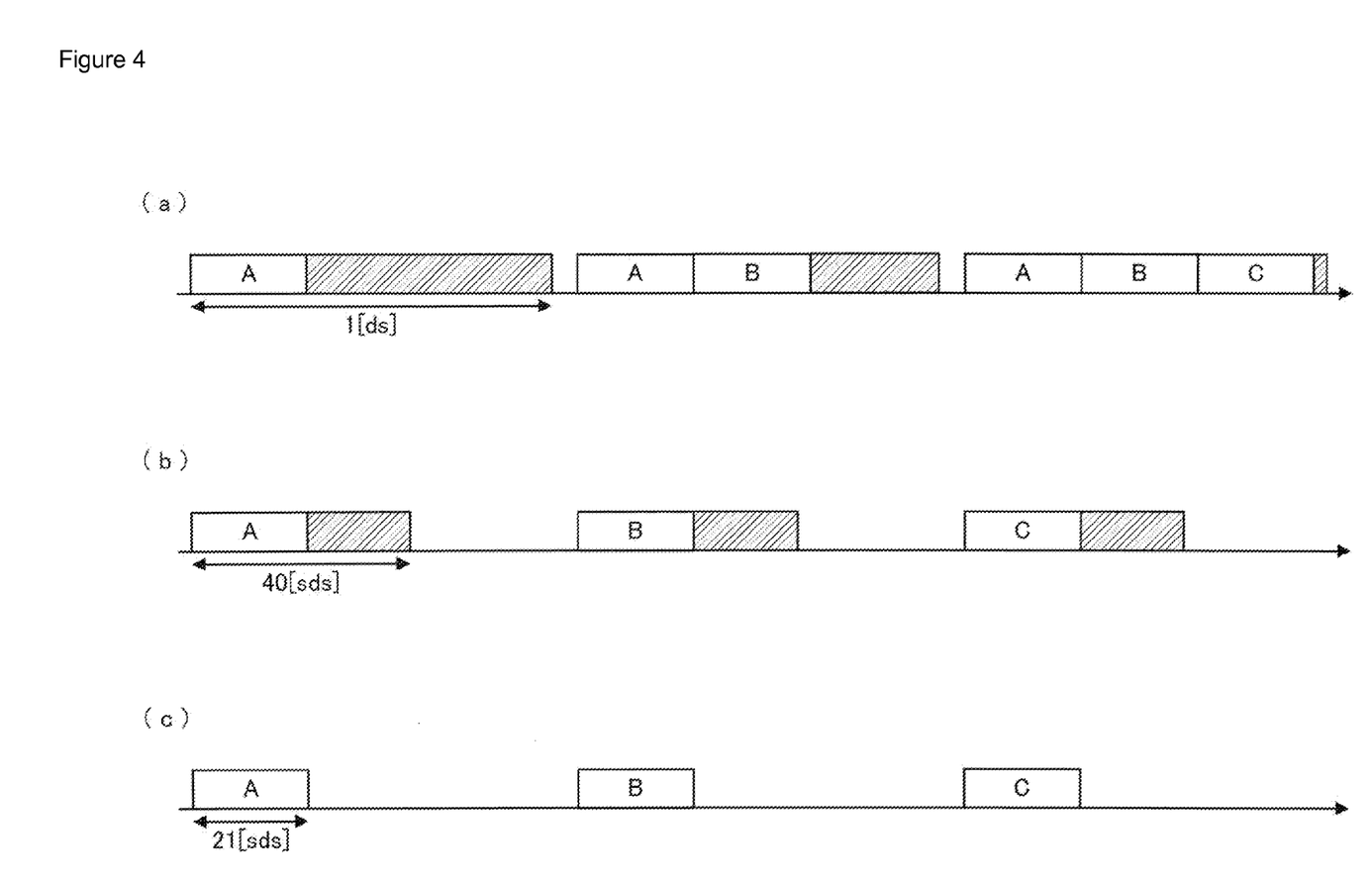
FIGS. 4A to 4C are diagrams schematically showing differences among the embodiment of the present invention and the different techniques.

FIGS. 4A to 4C show data written to tape media in synchronization in a case of the transaction size of 505442 bytes. Data written in the first synchronization, the second synchronization, and the third synchronization are shown from the left. In FIG. 4A, "ds" denotes the dataset, and "sds" denotes the sub dataset.

FIG. 4A shows a case where data is written to the tape medium in synchronizations in the conventional example. In the conventional example, the dataset is formed by padding a part other than data sent from the host, as hatched by oblique lines. The data is written in units of this dataset. In FIG. 4A, sub datasets A, B, and C are accumulated in a certain dataset, and writing is performed in units of dataset. Accordingly, in the second synchronization, not only the sub dataset B including updated information but also the sub dataset A having already been written is written to the tape medium. In the third synchronization, not only the sub dataset C including updated information but also the sub datasets A and B having already been written are written to the tape medium.

FIG. 4B shows a case where data is written to the tape medium in synchronizations in the comparative example. In the comparative example, a pair of new sub datasets (corresponding to 40 sub datasets) is formed by padding a part other than data sent from the host, as hatched by oblique lines. The data is written in units of the new sub dataset pair. FIG. 4B shows that the writing is performed in the following manner. In the first synchronization, first to fortieth sub datasets among the sub datasets forming the dataset are written, and in the second synchronization, twenty-second to sixthly-first sub datasets among the sub datasets forming the dataset are written. Accordingly, in every synchronization, only the sub datasets including updated information are written to the tape medium.

FIG. 4C shows a case where data is written to the tape medium in synchronizations in the inventive example. In the inventive example, a group including the minimum number of sub datasets (corresponding to 21 sub datasets) required to store data of 505442 bytes sent from the host is formed. The data is written in units of this group including the smallest required number of sub datasets. The writing is performed in the following manner In FIG. 4C. In the first synchronization, first to twenty-first sub datasets among the sub datasets forming the dataset are written, and in the second synchronization, twenty-second to forty-second sub datasets among the sub datasets forming the dataset are written. Accordingly, in every synchronization, only the sub datasets including updated information are written to the tape medium.

Next, functional configuration of the controller 16 for achieving the operations described above will be described.

Figure 5:
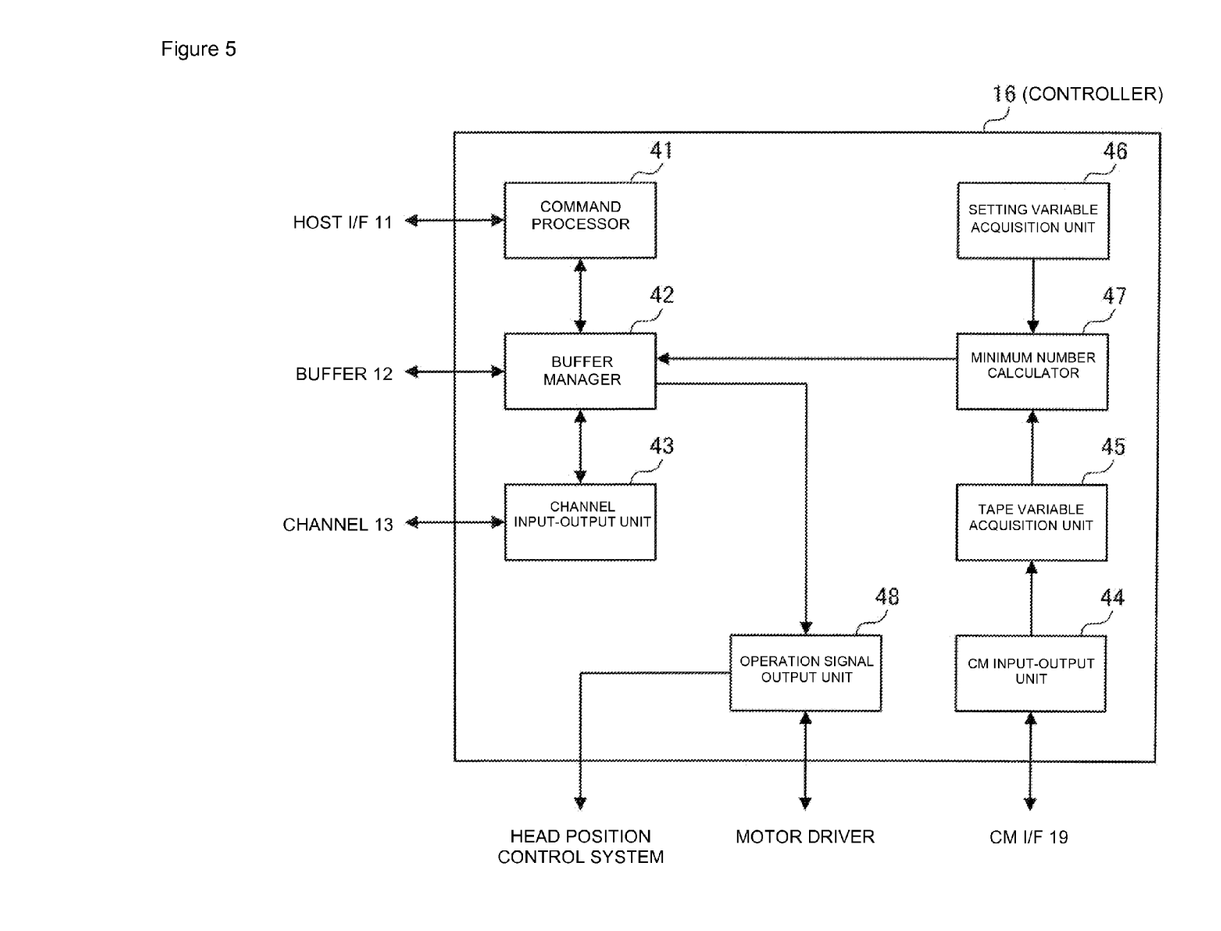
FIG. 5 is a block diagram showing a functional configuration example of a controller in the embodiment of the present invention.

FIG. 5 is a block diagram showing an example of a functional configuration of the controller 16.

As shown in FIG. 5, the controller 16 includes a command processor 41, a buffer manager 42, a channel input-output unit 43, a cartridge memory input-output unit (hereafter, referred to as "CM input-output unit") 44, a tape variable acquisition unit 45, a setting variable acquisition unit 46, a minimum number calculator 47, and an operation signal output unit 48.

Among these, the command processor 41 receives commands from the host I/F 11. Examples of the commands include a Write command instructing the tape drive 10 to store data in the buffer 12 and a synchronization command (such as Write FM command) instructing the tape drive 10 to write data stored in the buffer 12 to the tape 23. In this embodiment, the synchronization command is used as an example of a synchronization instruction, and the command processor 41 is provided as an example of a reception unit which receives the synchronization instruction.

The buffer manager 42 stores data in the buffer 12 when the command processor 41 receives the Write command. In addition, when the command processor 41 receives the synchronization command, the buffer manager 42 reads data from the buffer 12 and outputs the data to the channel input-output unit 43. In this embodiment, the buffer manager 42 is provided as an example of a generation unit which generates write data to be written to the tape medium in response to the synchronization instruction.

The channel input-output unit 43 outputs data read by the buffer manager 42 from the buffer 12 to the channel 13. In addition, the channel input-output unit 43 stores data received from the channel 13 in the buffer 12. In this embodiment, the channel input-output unit 43 is provided as an example of a writing unit which writes write data.

The CM input-output unit 44 acquires information stored in the cartridge memory 24. The information stored in the cartridge memory 24 includes information related to the format of the tape 23. Moreover, the CM input-output unit 44 sends the cartridge memory 24 information to be stored therein. In this embodiment, the CM input-output unit 44 is provided as an example of an identification unit which identifies a type of the format of the tape medium.

The tape variable acquisition unit 45 acquires variables (hereafter, referred to as "tape variables") relating to the tape 23 on the basis of the information on the format of the tape 23 which is acquired by the CM input-output unit 44. The tape variables include a linear recording density ld [byte/m], the number of tracks not, a capacity of sub dataset csds [byte], a maximum recoverable ratio rr. In this embodiment, the maximum recoverable ratio rr is used as an example of a ratio of a part of data with respect to the entire data, provided that the part is defined as a trivial part allowing the entire data to be recovered even with a failure in reading the part. Furthermore, the tape variable acquisition unit 45 is provided as an example of a ratio acquisition unit which acquires the ratio.

The setting variable acquisition unit 46 acquires variables set for the tape drive 10 (hereafter, referred to as "setting variables"). The setting variables include the maximum defect length mdl [m] and the factor of safety fs. In this embodiment, a defect on the tape 23 is used as an example of a trouble. Furthermore, the maximum defect length mdl [m] is used as an example of the size of an area on the tape medium that may be affected by the trouble. In addition, the setting variable acquisition unit 46 is provided as an example of a size acquisition unit which acquires the size.

The minimum number calculator 47 calculates the minimum number m of sub datasets to be written in response to the synchronization command, by using the tape variables acquired by the tape variable acquisition unit 45 and the setting variables acquired by the setting variable acquisition unit 46. In this embodiment, the sub datasets are used as an example of data blocks forming the write data. Furthermore, the minimum number m of the sub datasets is used as an example of the minimum number of data blocks. In addition, the minimum number calculator 47 is provided as an example of a determination unit which determines the minimum number of data blocks.

The operation signal output unit 48 outputs a signal instructing the head position control system 17 to switch the wrap, and outputs a signal instructing the motor driver 18 to run the tape 23. In this embodiment, the operation signal output unit 48 is provided as an example of a running controller which controls the running of the tape medium.

Figure 6:
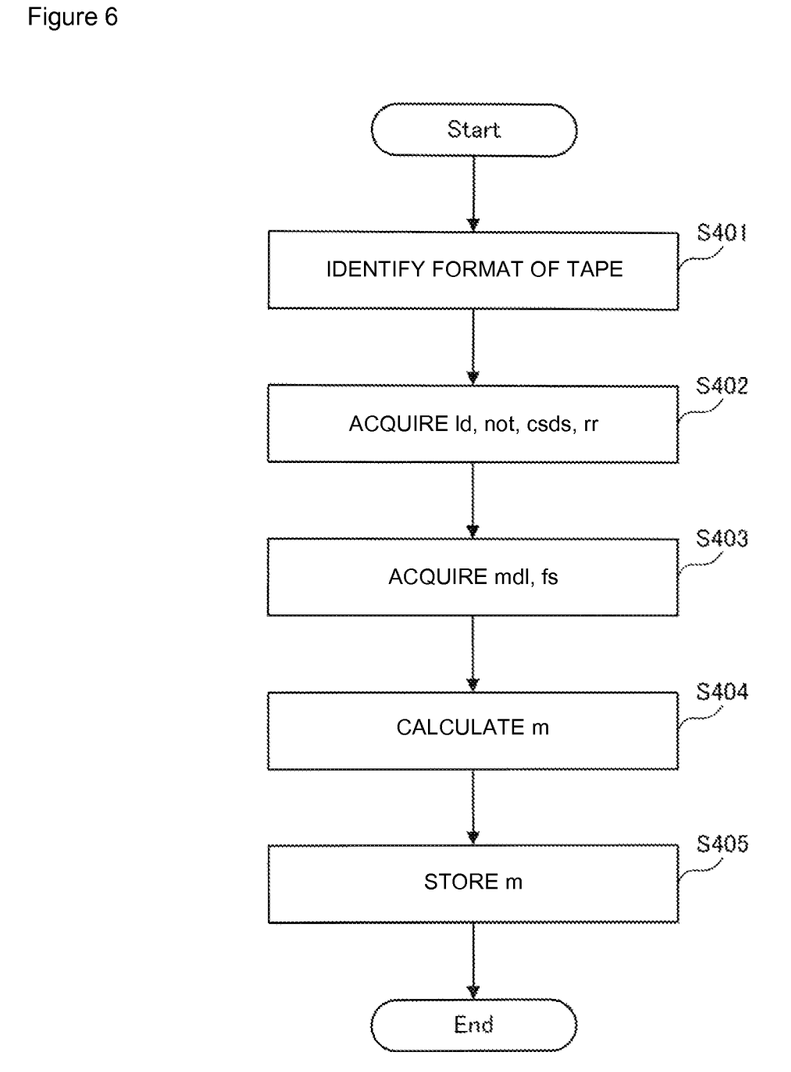
FIG. 6 is a flowchart showing an example of an operation of the controller in determining the minimum number of sub datasets in the embodiment of the present invention.

Next, operations of the controller 16 will be described. FIG. 6 is a flowchart showing an example of an operation of the controller 16 in determining the minimum number m of sub datasets. This operation example is to be started when a new tape cartridge 20 is installed or when the format of the tape 23 of the tape cartridge 20 is changed while the tape cartridge 20 is loaded.

Firstly, in the controller 16, the CM input-output unit 44 acquires the information indicating the format of the tape 23 (Step 401). If the tape drive 10 is a tape drive for enterprise or is a tape drive in compliance with the LTO standards, the format can be identified from the generation of the tape drive. Thus, it is only necessary to acquire information for identifying the generation.

When the information for identifying the generation is acquired as described above, the tape variable acquisition unit 45 acquires the linear recording density ld [byte/m], the number of tracks not, the capacity of sub dataset csds [byte], the maximum recoverable ratio rr as the tape variables (Step 402). In this case, for example, it is preferable that correspondence information between the generation and values of these variables is stored in advance in an unillustrated memory, and that the values of the variables corresponding to the generation indentified in Step 401 is acquired by referring to the correspondence information.

Meanwhile, the setting variable acquisition unit 46 acquires the maximum defect length mdl [m] and the factor of safety fs as the setting variables (Step 403). The setting variables may be those set before the shipping of the tape drive 10, or may be those set by a user after shipping of the tape drive 10.

From these variables, the minimum number calculator 47 obtains the smallest integer satisfying the following formula as the minimum number m of sub datasets (Step 404):

$$m > mdl*ld*not/csds/rr*fs \qquad (3).$$

Then, the obtained minimum number m is stored in an unillustrated memory (Step 405).

Figure 7:
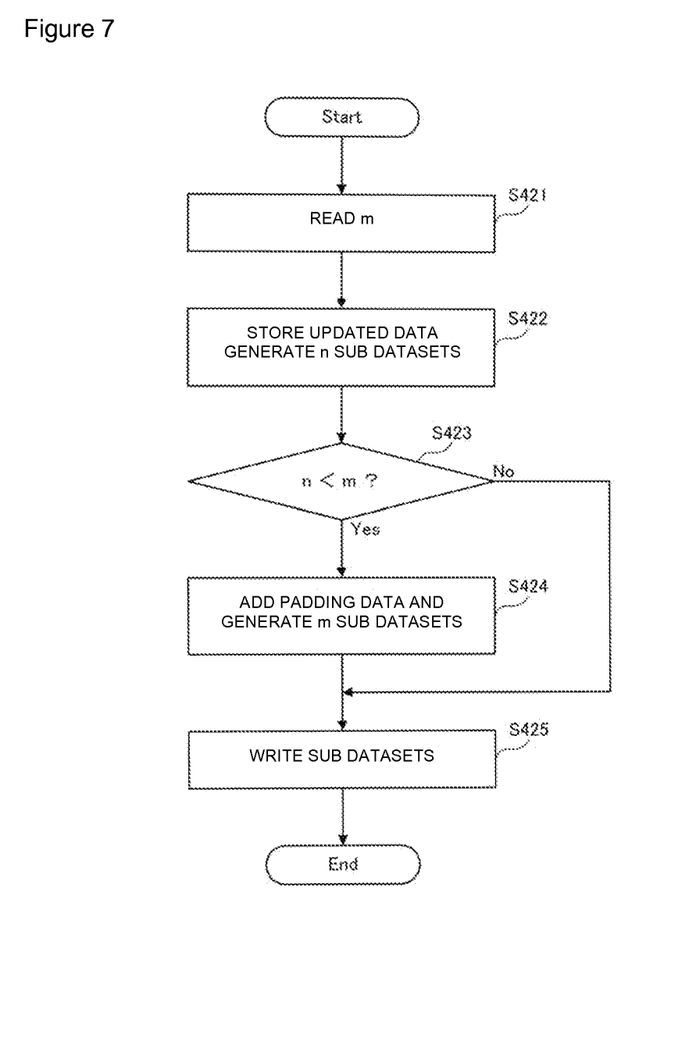
FIG. 7 is a flowchart showing an operation example of the controller in writing sub datasets in the embodiment of the present invention.

FIG. 7 is a flowchart showing an operation example of the controller 16 in writing the sub datasets to the tape 23. This operation example is to be started when the command processor 41 receives the synchronization command from the host 30 while data is accumulated in the buffer 12. For simplicity of explanation, it is assumed here that only data updated after a previous synchronization is accumulated in the buffer 12.

Firstly, in the controller 16, the buffer manager 42 reads the minimum number m of sub datasets which is stored in the unillustrated memory in Step 405 (Step 421).

Moreover, the number n of sub datasets for storing the updated data accumulated in the buffer 12 is obtained, and n sub datasets for storing the updated data are generated (Step 422).

Then, the buffer manager 42 judges whether or not the number n of sub datasets generated in Step 422 is smaller than the minimum number m of sub datasets which is calculated in Step 421 (Step 423).

If the number n of sub datasets is judged as being smaller than the minimum number m of sub datasets, the buffer manager 42 adds sub datasets including padding data to the n sub datasets generated in Step 422, and thereby generates m sub datasets (Step 424).

Thereafter, the m sub datasets are passed to the channel input-output unit 43, and the channel input-output unit 43 writes the m sub datasets in a temporary recording region for RABF on the tape 23 (Step 425). Specifically, in accordance with an instruction from the buffer manager 42, the operation signal output unit 48 outputs a signal instructing the head position control system 17 to switch a wrap to a wrap including the temporary recording region. After the m sub datasets are written in the temporary recording region, the operation signal output unit 48 outputs a signal instructing the motor driver 18 to perform backhitchless tape running.

On the other hand, if the number n of sub datasets is judged as being equal to or larger than the smallest number m of sub datasets, the n sub datasets generated in Step 422 is passed to the channel input-output unit 43, and the channel input-output unit 43 writes the n sub dataset in the temporary recording region for RABF on the tape 23 (step 425). Specifically, in accordance with an instruction from the buffer manager 42, the operation signal output unit 48 outputs a signal instructing the head position control system 17 to switch a wrap to a wrap including the temporary recording region. After the n sub datasets are written in the temporary recording region, the operation signal output unit 48 outputs a signal instructing the motor driver 18 to perform backhitchless tape running As described above, in this embodiment, data including updated information is not written to the tape medium in fixed units regardless of whether dataset or sub dataset. Instead, only required sub datasets of the minimum or more for securing resistance to burst error are written. Thus, the resistance to burst error is secured while the writing performance in RABF is improved.

Note that, in this embodiment, the minimum number m of sub datasets is determined by the formula "m>mdl*ld*not/csds/rr*fs". However, the determination method is not limited to this formula. Any method can be used, as long as the maximum defect length mdl [m] and the maximum recoverable ratio rr are used and thereby the minimum number m of sub datasets is determined such that entire data written to the tape medium can be recovered even when a part of the data cannot be read due to a defect or debris.

According to the mechanisms of the present invention, the performance of writing to the tape medium can be improved while resistance to error is secured.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system, operable by a processor device, for setting information to be referred to when data is written to a tape medium, the apparatus comprising:
   a size acquisition unit in communication with the processor device, the size acquisition unit adapted for acquiring a size of an area on the tape medium affected by a defect occurring on the tape medium;
   a ratio acquisition unit in communication with the size acquisition unit, the ratio acquisition unit adapted for acquiring a ratio of a part of the data to be written to the tape medium with respect to an entirety of the data to be written, the part of the data to be written being recoverable by an error correction code; and
   a determination unit in communication with the ratio acquisition unit, the determination unit adapted for, by using the size acquired by the size acquisition unit and the ratio acquired by the ratio acquisition unit, determining a minimum number of data blocks to form write data such that an entirety of the write data may be recovered in an event that a part of the write data fails to be read due to the defect, the write data being written to the tape medium in response to a synchronization instruction to write reception data received from a higher-level apparatus to the tape medium.

2. The system according to claim 1 further comprising:
   a reception unit, in communication with the determination unit, adapted for receiving the synchronization instruction;
   a generation unit in communication with the reception unit, the generation unit adapted for generating the write data when the reception unit receives the synchronization command in such a manner that if the reception data is smaller than the minimum number of data blocks determined by the determination unit, the write data contains the reception data and includes the minimum number of data blocks determined by the determination unit, and that if the reception data is one of equal to and larger than the minimum number of data blocks determined by the determination unit, the write data includes a minimum necessary number of data blocks required to contain the reception data; and a writing unit, in communication with the generation unit, adapted for writing the write data generated by the generation unit to the tape medium.

3. The system of claim 2, further comprising a running controller in communication with the writing unit, adapted for controlling running of the tape medium such that hitchback is not performed after the write data is written to the tape medium by the writing unit.

4. The system of claim 1, further comprising an identification unit, in communication with the processor device, adapted for identifying a type of a format of the tape medium, wherein the ratio acquisition unit is further adapted for acquiring the ratio corresponding to the type of the format identified by the identification unit.

5. An apparatus, operable by a processor device, that writes reception data received from a higher-level apparatus to a tape medium in response to a synchronization instruction to write the reception data to the tape medium, the apparatus comprising:

a number acquisition unit for acquiring a minimum number of data blocks to form write data to be written to the tape medium in response to the synchronization instruction, the minimum number of data blocks allowing recovery of an entirety of the write data in an event that a part of the write data fails to be read due to a defect included on the tape medium;

a size acquisition unit, in communication with the number acquisition unit, for acquiring a size of an area on the tape medium including the defect;

a ratio acquisition unit, in communication with the size acquisition unit, for acquiring a ratio of a part of data to be written to the tape medium with respect to an entirety of the data to be written, the part of the data to be written being recoverable by an error correction code;

a determination unit, in communication with the ratio acquisition unit, for determining the number of the data blocks to be acquired by the number acquisition unit, by using the size acquired by the size acquisition unit and the ratio acquired by the ratio acquisition unit;

a reception unit, in communication with the number acquisition unit, for receiving the synchronization instruction;

a generation unit, in communication with the reception unit, for generating the write data when the reception unit receives the synchronization command, in such a manner that if the reception data is smaller than the minimum number of data blocks acquired by the number acquisition unit, the write data includes the minimum number of data blocks acquired by the number acquisition unit and contains the reception data, and that if the reception data is one of equal to and larger than the minimum number of data blocks acquired by the number acquisition unit, the write data includes a minimum necessary number of data blocks required to contain the write data; and a writing unit, in communication with the generation unit, for writing the write data generated by the generation unit to the tape medium.

6. A method for writing reception data received from a higher-level apparatus to a tape medium in response to a synchronization instruction from a processor to write the reception data to the tape medium, the method comprising the steps of:

acquiring a minimum number of data blocks to form write data to be written to the tape medium in response to the synchronization instruction, the minimum number of data blocks for recovering an entirety of the write data in an event that a part of the write data fails to be read due to a defect included on the tape medium;

acquiring a size of an area on the tape medium including the defect;

acquiring a ratio of a part of data to be written with respect to an entirety of the data to be written, the part of the data to be written being recoverable by an error correction code;

determining the minimum number of data blocks, by using the size acquired and the ratio acquired by the ratio acquired;

receiving the synchronization instruction;

upon receipt of the synchronization instruction, generating the write data in such a manner that if the reception data is smaller than the minimum number of data blocks, the write data includes the acquired number of data blocks containing the reception data, and that if the reception data is equal to or larger than the minimum number of data blocks, the write data includes a minimum necessary number of data blocks required to contain the write data; and writing the write data to the tape medium.

7. A computer program product for setting information to be referred to when data is written to a tape medium, the computer program product comprising a non-transitory computer-readable storage medium having computer-readable program code portions stored therein, the computer-readable program code portions comprising:

a first executable portion for acquiring a size of an area on the tape medium affected by a defect on the tape medium;

a second executable portion for acquiring a ratio of a part of data to be written to the tape medium with respect to an entirety of the data to be written, the part of the data to be written being recoverable by an error correction code; and a third executable portion for, by using the size and the ratio, determining a minimum number of data blocks to form write data such that an entirety of the write data may be recovered in an event that a part of the write data fails to be read due to the defect, the write data being to be written to the tape medium in response to a synchronization instruction to write reception data received from a higher-level apparatus to the tape medium.

8. The computer program product according to claim 7 further comprising:

a fourth executable portion for receiving the synchronization instruction;

a fifth executable portion for generating the write data when the synchronization command is received in such a manner that if the reception data is smaller than the minimum number of data blocks, the write data contains the reception data and includes the minimum number of data blocks determined by the determination unit, and that if the reception data is one of equal to and larger than the minimum number of data blocks, the write data includes a minimum necessary number of data blocks required to contain the reception data; and a sixth executable portion for writing the write data to the tape medium.

9. The computer program product of claim 8, further including a seventh executable portion for controlling running of the tape medium such that hitchback is not performed after the write data is written to the tape medium.

10. The computer program product of claim 7, further including a fourth executable portion for identifying a type of a format of the tape medium, and further including acquiring the ratio corresponding to the type of the identified format.

* * * * *